June 30, 1970 S. A. WINGATE 3,518,661

LINEAR MOTION CONVERTER

Filed Sept. 9, 1966 3 Sheets-Sheet 1

INVENTOR.
SIDNEY A. WINGATE
BY Morse, Altman + Oates
ATTORNEYS

LINEAR MOTION CONVERTER

Filed Sept. 9, 1966 3 Sheets-Sheet 2

INVENTOR.
SIDNEY A. WINGATE
BY
Morse, Altman + Oates
ATTORNEYS

LINEAR MOTION CONVERTER

Filed Sept. 9, 1966 3 Sheets-Sheet 3

INVENTOR.
SIDNEY A. WINGATE
BY
Moore, Altman + Oates
ATTORNEYS

United States Patent Office 3,518,661

Patented June 30, 1970

3,518,661

LINEAR MOTION CONVERTER

Sidney A. Wingate, Concord, Mass., assignor, by mesne assignments, to Itek Corporation, Lexington, Mass., a corporation of Delaware Filed Sept. 9, 1966, Ser. No. 578,403

Int. Cl. H03k *13/02*

U.S. Cl. 340—347 10 Claims

ABSTRACT OF THE DISCLOSURE

Apparatus for measuring linear movement along two perpendicular axes on a flat table. A relatively heavy carriage is straddled across the table for movement along a first axis. The carriage is connected by a cabling system to a rotary encoder which gives an indication of the movement of the carriage along the first axis. A relatively light reticle plate is mounted for movement on the carriage along a second axis which is perpendicular to the first axis. The reticle plate is coupled by a second cabling system to a second linear encoder which yields an indication of movement along the second axis. The difference in the moments of inertia of the relatively heavy carriage and the relatively light reticle plate is compensated for by connecting a flywheel to the reticle plate such that linear motion of the reticle plate is converted into the rotary motion of the flywheel. This equalizes the forces required to move the carriage along the first axis and the reticle plate along the second axis. Each cabling system has an endless loop cable which is wrapped for several turns around a drum with a helical track in its periphery which is mounted on each encoder shaft.

This invention relates generally to the conversion of linear movements into digital outputs and more particularly is directed towards a two axis encoding system adapted to generate digital outputs defining the X–Y coordinates of any point in a measurement plane.

In certain fields of activity there is a need for precisely defining a point or a series of points over a given measurement plane. For example, in mapping work or in plotting the photographed tracks of subatomic particles, it would be extremely useful if any selected point or points may be quickly, easily and accurately encoded into digital information.

Accordingly, it is an object of the present invention to provide a two axis encoding system adapted to generate digital outputs defining the X–Y coordinates of any point in a measurement plane.

A further object of this invention is to provide a novel linear motion encoder characterized by high resolution and ease of operation.

More particularly, this invention features an X–Y coordinate digital converter, comprising a table, a bridge assembly spanning the table and adapted to move along one axis of the table and a tracking reticle carried by the bridge assembly and adapted to be moved lengthwise of the bridge along another axis perpendicular to the first axis. The bridge assembly supports a precision rod and is drivingly connected by a wire and pulley system to an encoding device whereby movement of the bridge perpendicular to its axis will produce a digitally coded output. Similarly, the tracking reticle is drivingly connected by another wire and pulley system to another encoding device carried by the bridge whereby movement of the tracking reticle along the bridge will generate a digital output corresponding to the position of the tracking reticle with relation to the bridge. Thus, the two digital outputs represent the X–Y position of the tracking reticle over the table.

Figure 1:
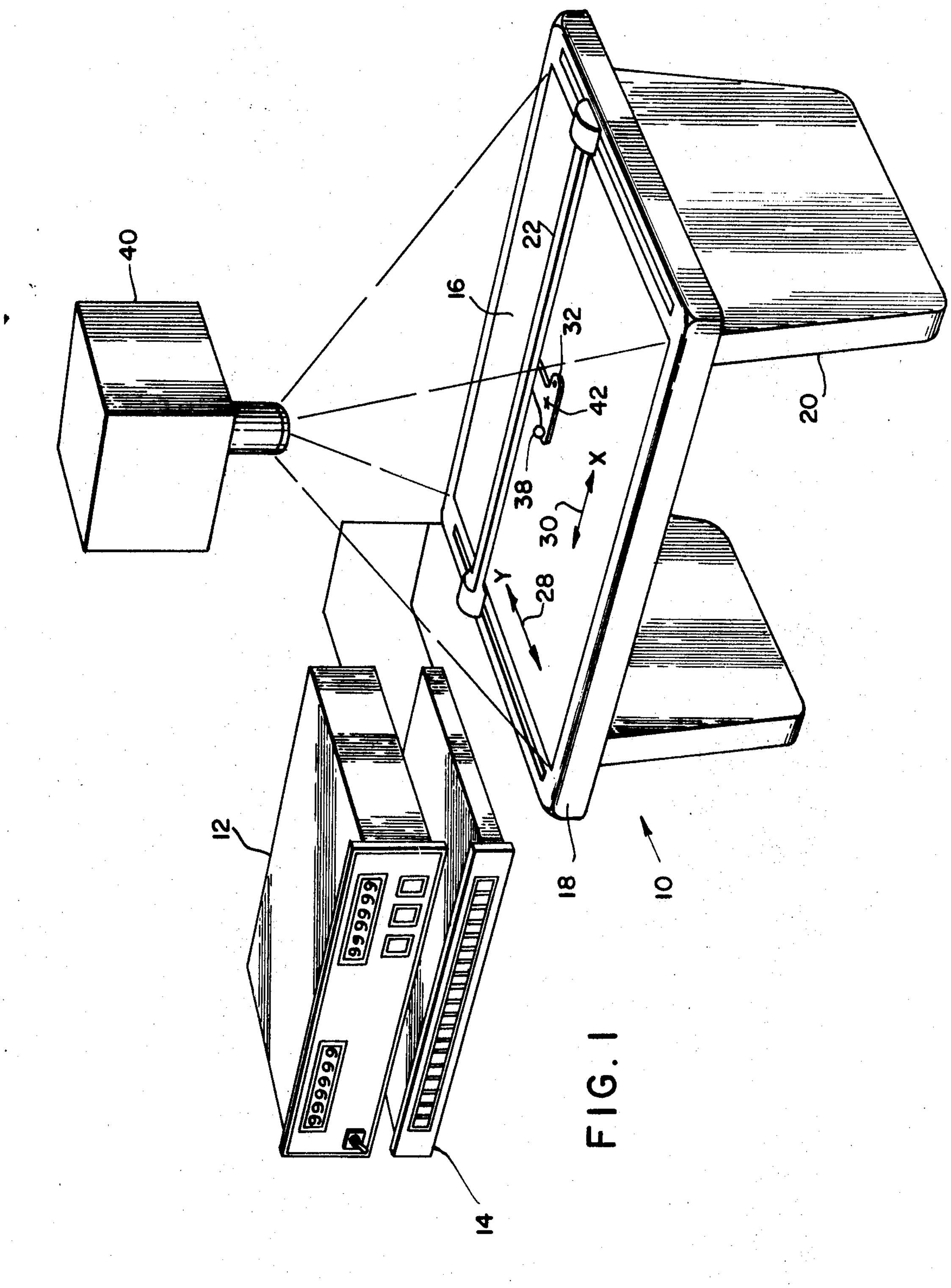
Figures 2, 3, 4:
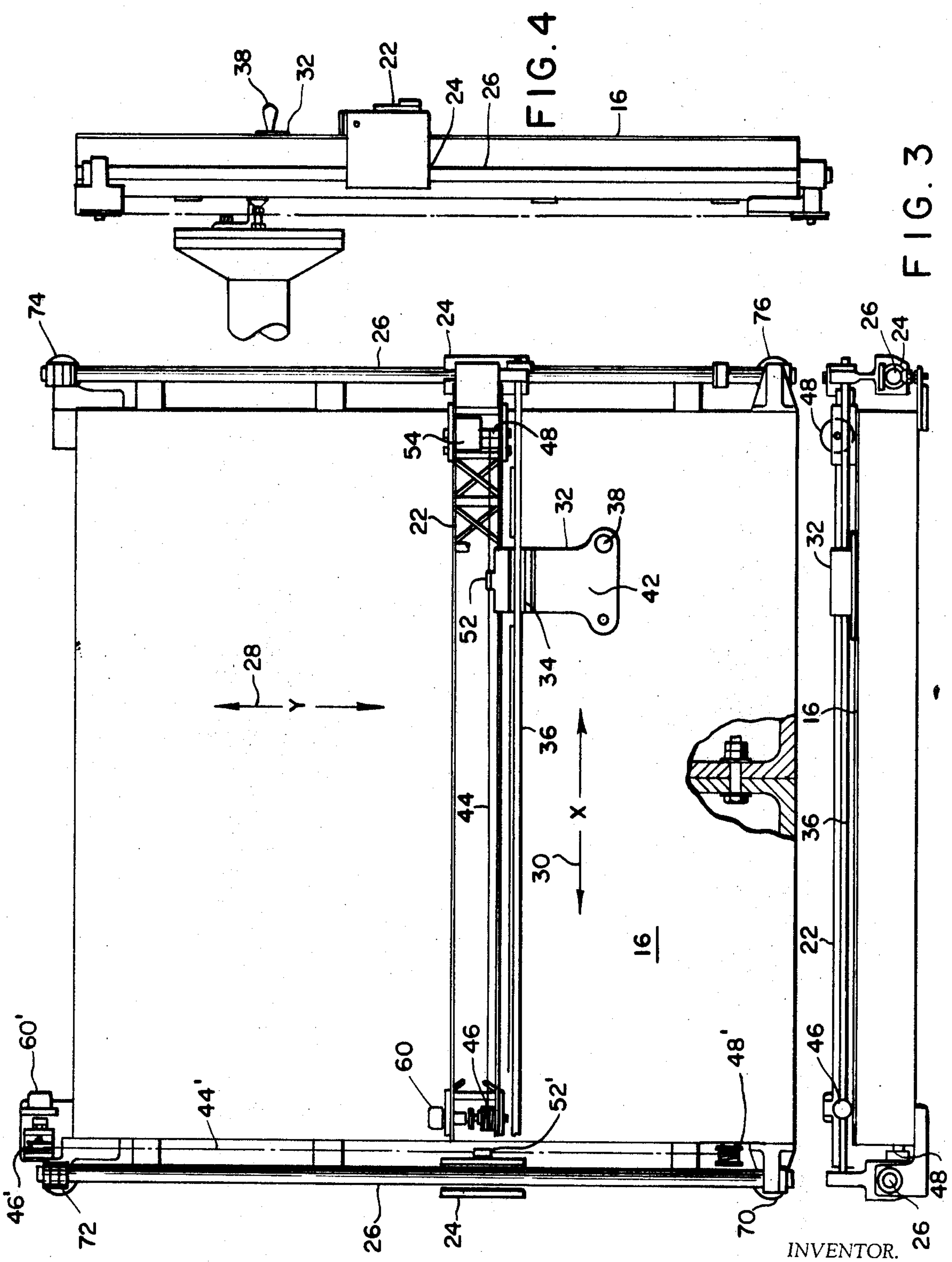
Figure 5:
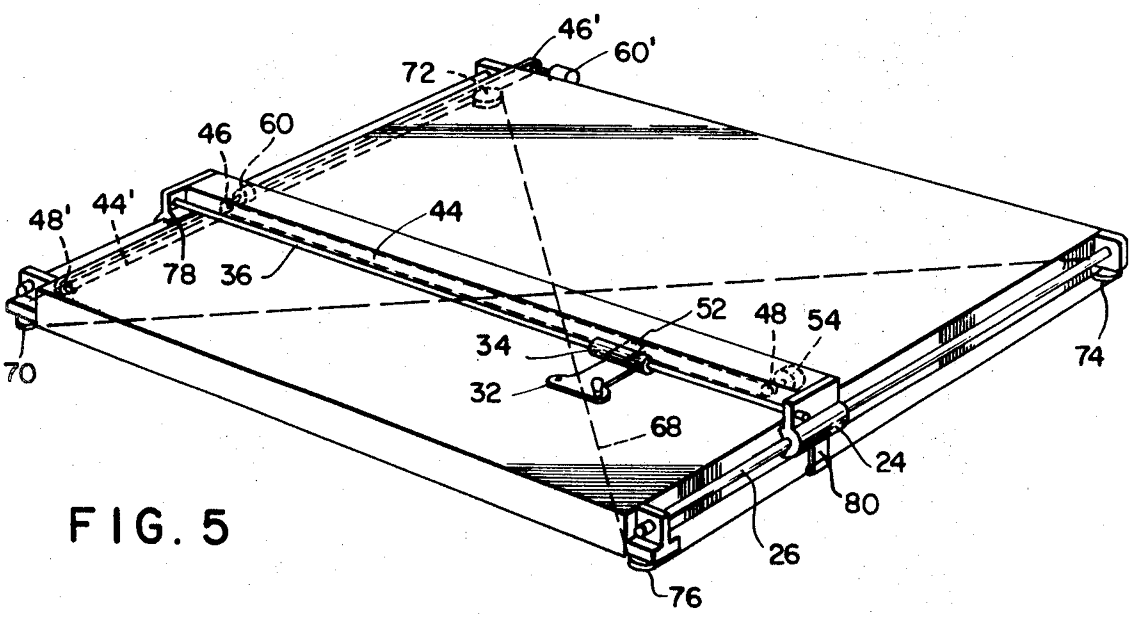
Figure 6:
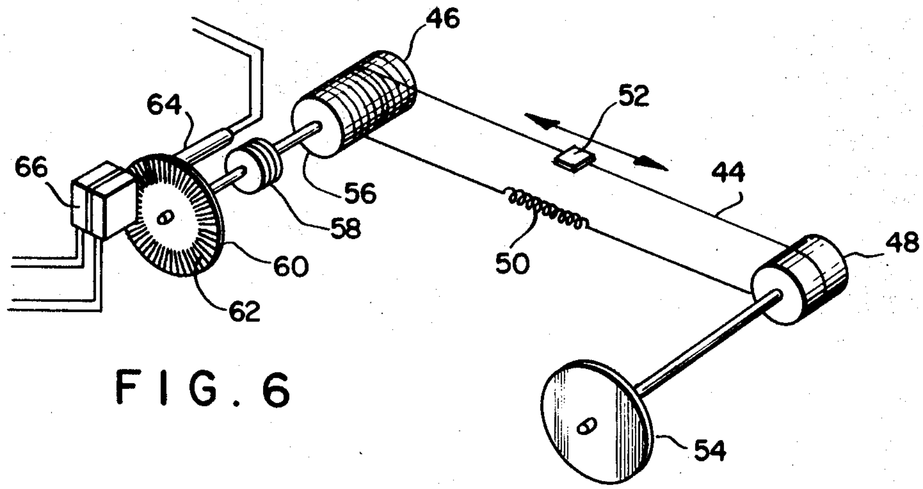
Figure 7:
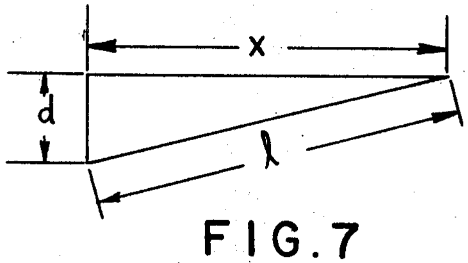

However, these and other features of the invention, along with further objects and advantages thereof, will become more fully apparent from the following detailed description of a preferred embodiment of the invention, with reference being made to the accompanying drawings, in which:

FIG. 1 is a view in perspective somewhat schematic of an X–Y coordinate digital converter made according to the invention, FIG. 2 is a top plan view thereof, FIG. 3 is a view in front elevation thereof, FIG. 4 is a view in side elevation thereof, FIG. 5 is a schematic perspective view of the table assembly and pulley system, FIG. 6 is a view in perspective somewhat schematic of a single linear motion encoder employed in the converter, and FIG. 7 is a diagram used for illustrative purposes.

Referring now to the drawings, the reference character 10 generally indicates an X–Y coordinate table operatively connected to a digital display console 12 and a switch panel 14. The table 10 includes a flat top surface 16 formed on a rigid horizontal member 18 supported by legs 20. The table top member 18 preferably is a beamed cast aluminum structure of high rigidity and stiffness and preferably supported by a three point suspension to reduce bending stresses. The surface 16 is characterized by a high degree of flatness on the order of plus or minus .005″ to a mean plane. In practice, the table surface is covered by a smooth, hard sheet material such as sold under the trademark "Formica." The beam configuration of the table member extends about four inches below the table surface and provides greater stiffness to loads normal to the top surface.

Mounted over the table surface 16 is a bridge 22 supported at its ends by open ball bushings 24 engaging horizontal cylindrical rods 26 mounted to the sides of the table and extending the full depth thereof. The bushings are of the open type which wrap most of the way around the rods 26 but leave a clear portion for bolts attaching the rods to the table. The bridge is thus adapted to be moved from front to rear of the table along the Y axis indicated by the arrow 28. Mounted for movement along the X axis indicated by the arrow 30 is a reticle plate 32 slidably mounted by ball bushings 34 to a rather small diameter cylindrical rod 36 mounted to the bridge 22. It will thus be understood that the reticle plate 32 may be moved to any point on the table surface by moving the bridge along the Y axis or the reticle plate along the X axis or a combination thereof.

The function of the bridge structure is to mount the X axis rod 36 rigidly over a wide span. Since the X axis assembly spans a relatively long distance this structure must be rigid against bending in the Y axis direction. If the rigidity were obtained by merely using a rod of large diameter, the rod would be on the order of 1½″ thick and would weigh in excess of forty pounds. This would require a very substantial effort on the part of the operator when moving the reticle plate along the Y axis.

To avoid such problems the lightweight, small diameter rod 36 is used and is attached at a number of points along its length to the welded steel bridge which may be fabricated with very thin walled sections. The bridge structure although light in weight provides the desired stiffness along the Y axis.

The use of the bridge to support the rod has the further advantage of contributing to the straightness of the rod. By attaching the rod to the bridge at intervals the straightness may be adjusted at the attachment points since the rod itself cannot, in practice, be manufactured sufficiently straight for present purposes. Here again the ball bushing 34 is of the open type to provide clearance for the attachment bolts.

The reticle plate typically is provided with a detachable right or left-hand position knob 38 by which the plate may be manipulated over the surface of the table. Preferably the reticle plate is substantially the same color as the table surface so that when an image is projected onto the table surface from an overhead projector 40, the image will appear not only on the table surface but also on top of the reticle plate in a readily observable fashion. The plate is provided with a marker 42 such as a dot, or cross lines, for example. The instrument is actuated by the operator grasping the knob and moving the reticle plate until the marker 42 is directly in register with the particular spot of the projected image for which the X–Y coordinates are sought. The movement of the reticle plate will produce a digital output on the display console 12 representing a digital indication of the X–Y coordinates of the selected spot.

Where the apparatus is to be used in conjunction with a sheet such as a map, for example, which will overlay the table surface, the reticle plate will be provided with a transparent insert for viewing through the plate in place of the surface marker 42. Suitable cross hairs or a bull's-eye may be provided on the bottom of the insert for precise alignment with the underlying image.

Referring now more particularly to FIG. 6 there is shown in a somewhat schematic presentation a simplified illustration of one of the encoding components. While only one encoder is shown it is typical of both the X and Y systems. As shown in FIG. 6 the encoding system comprises a wire cord 44 one portion of which is wrapped several helical turns around a cylindrical and peripherally grooved drum 46 and another portion of which is looped around a pulley 48. Tension is maintained on the wire cord by means of a spring 50 joining the lower ends of the cord. In the midportion of the upper section of the cord, a connecting device 52 is provided for coupling the cord to the reticle plate 32 for the X system or to one end of the bridge for the Y system. In any event, it will be understood that as the reticle plate or the bridge is moved, the coupling 52 will cause the wire cord to move in a line either towards the pulley 48 or towards the drum 46 causing both of these units to rotate. The pulley 48 will be seen to be connected to a flywheel 54 which imparts a certain amount of inertia to the system. The grooved drum 46 is drivingly connected by a shaft 56 through a flexible coupling 58 to a shaft angle encoding device known in the art.

This configuration enhances the operation of the system by reason of the fact that the multiple turns of the wire around the drum substantially eliminates error producing slippage which might otherwise take place, particularly during acceleration. The helical grooves prevent the wrapped wire from wandering axially during operation. It will be appreciated that if the wire were to wander, it would not always repeat over successive cycles of linear motion over the full range. Such a condition would, of course, generate an error in the relationship between the encoder angle and linear position. The threaded drum constrains the axial motion of the wire wrap so that it always repeats and this source of error is thereby eliminated.

Referring to the diagram in FIG. 7 the linear relationship between translation and rotary motion will be proven through the following mathematical derivation:

$$L^2=x^2+d^2$$

$$d=\left(\frac{p}{c}\right)L$$

$$L^2=x^2+\frac{p^2}{c_2}L^2$$

$$x=L\sqrt{1-\left(\frac{p}{c}\right)^2}$$

Whereas:
$x$=linear motion at attachment point
$d$=axial motion at point of tangency to drum
$p$=pitch of groove
$c$=circumference of drum
L=length of wire The foregoing shows that $x$ is proportional to L by a constant factor involving the axial pitch of the groove and the circumference of the drum. These are both constant. This means that the wire length L is not equal to $x$, but it will be noted that they are linearly related quantities and a drum diameter may be chosen, knowing the pitch of the groove, in order to give the desired relationship betwen linear motion and encoder rotation. It is also important that when the attachment point (52 in FIG. 6) is moved all the way down to the point of tangency on the drum, the wire ends up in the groove directly beneath the attachment point. If this is not accomplished in the initial alignment of the system, then the relationship between linear motion and encoder rotation will not be linear.

Typically the encoding device comprises a rotary disc 60 provided with a plurality of radial slits 62 illuminated by a fixed light source 64. A fixed photodetecting device 66 is positioned opposite to the light source to produce electrical signals upon movement of the disc. The output signal corresponds to the rotary position of the disc which in turn represents the linear position of the plate or bridge. This data is fed to the console 12 for conversion to digital form. For the $x$ coordinate, the wire cord 44 extends substantially full length of the brideg 22 and the pulley 48 and drum 46 are mounted at the ends of the bridge so that the reticle plate may be moved substantially over the full width of the table. The shaft angle encoder is also mounted at the end of the bridge as shown in FIG. 2.

As best shown in FIG. 5, it will be seen that the coupling 52 connects to the reticle plate 32 by means of the ball bushings 34 which extend parallel to the cord and are rigidly supported by the bridge.

In similar fashion, the bridge, which is slidably supported at its ends on the rods 26 by means of the ball bushings 14, is drivingly connected to a wire cord 44' for the Y pulley system by means of a coupling 52'. The Y system includes a pulley 48' and a peripherally grooved cylindrical drum 46' drivingly connected to a shaft angle encoder generally indicated by reference character 60'. Thus, as the bridge is moved in the Y axis the shaft angle encoder will be actuated to produce a digital output representing the Y position of the bridge. Thus, with the two outputs of the shaft angle encoders 60 and 60', the X–Y coordinates of the position of the reticle plate over the table surface will be precisely defined.

In order to insure that the ends of the bridge move in a precisely uniform manner regardless of where the pressure might be applied to move the bridge, a counterbalancing wire and pulley system is provided. This pulley system includes a tensioned cord 68 which extends in crossing diagonal arrangement, shown best in FIG. 5, about pulleys 70, 72, 74 and 76 located at the corners of the table. Coupling devices 78 and 80 are attached to the pulley cord 69 between pairs of pulleys 70 and 72 and 74 and 76. These coupling devices are attached to the ends of the bridge so that as one end of the bridge is pushed or pulled along the Y axis, this force will be transmitted through the pulley system to apply an equal force in the same direction on the opposite end of the bridge.

While the invention has been described with particular reference to the illustrated embodiment, it will be understood that numerous modifications thereto will appear to those skilled in the art. Accordingly, the above description and accompanying drawings should be taken as illustrative of the invention and not in a limiting sense.

Having thus described the invention, what I claim and desire to obtain by Letters Patent of the United States, is:

1. Apparatus for measuring linear movement along two axes comprising:
   (a) a bridge member mounted for movement along a first axis;
   (b) first measuring means connected to said bridge member for yielding an output signal indicative of movement of said bridge member along said first axis;
   (c) a movable element mounted on said bridge member for movement along said bridge member parallel to a second axis which is approximately orthogonal to said first axis;
   (d) second measuring means connected to said element for yielding an output signal indicative of movement of said element along said second axis; and
   (e) inertia means coupled to said second element for rendering substantially equal the forces required to initiate a given movement of said bridge member along said first axis and said element along said second axis.

2. Apparatus as set forth in claim 1 where said inertia means is a flywheel.

3. Apparatus as set forth in claim 1 wherein said bridge member includes a relatively light bar, a truss network to support said bar, and said movable element is mounted for movement along said bar.

4. Apparatus as set forth in claim 1 wherein said second measuring means includes a rotary encoder which is connected to said movable element by a flexible elongated cable means.

5. Apparatus as set forth in claim 4 wherein said rotary necoder has a drum mounted on its shaft which has a helical track around its periphery and said cable means has several turns wrapped around said drum in said helical track.

6. Apparatus as set forth in claim 5 wherein said cable means is attached to said movable element and said drum such that when the attachment point on said movable element is moved adjacent to said drum, the cable means is in said helical track directly below the attachment point.

7. Apparatus as set forth in claim 4 wherein:
   (a) said inertia means is a flywheel.
   (b) said flexible elongated cable means is an endless loop; and
   (c) said cable means is connected to said rotary encoder which is mounted at one end of said bridge member and is connected to said flywheel which is mounted at the other end of said bridge member.

8. Apparatus as set forth in claim 7 wherein said rotary necoder has a drum mounted on its shaft which has a helical track around its periphery and said cable means has several turns wrapped around said drum in said helical track.

9. Apparatus as set forth in claim 8 wherein said cable means is attached to said movable element and said drum such that when the attachment point on said movable element is moved adjacent to said drum, the cable means is in said helical track directly below the aattachment point.

10. Apparatus as set forth in claim 9 wherein said bridge member is mounted for movement along said first axis by a first wire and pulley system wherein one wire is attached to one side of said bridge member at one end of said bridge member, and runs to a first pulley where its direction is changed to transmit it via a second pulley to the second side of said bridge member at the other end of said bridge member, the first and second pulleys acting to give said one wire a Z configuration, and a second wire and pulley system wherein a second wire is attached to the second side of said bridge member at said one end and runs to a third pulley where its direction is changed to transmit it via a fourth pulley to the first side of said bridge member at the other end of said bridge member, the third and fourth pulleys acting to give said second wire a Z configuration.

References Cited

UNITED STATES PATENTS

| | | | |
|---|---|---|---|
| 3,422,537 | 1/1969 | Dewey et al. | 33—18 |
| 2,910,684 | 10/1959 | Jones | 340—347 |
| 3,154,855 | 11/1964 | Pelton | 33—18 |
| 3,182,399 | 5/1965 | Price | 340—347 |
| 3,372,485 | 4/1968 | Mangus et al. | |
| 3,271,564 | 9/1966 | Rosenfeld et al. | 340—347 |

OTHER REFERENCES

Cartesian Coordinate Planar Drive System, Whistler, RCA TN No. 339, November 1959.

MAYNARD R. WILBUR, Primary Examiner

J. GLASSMAN, Assistant Examiner

U.S. Cl. X.R.

33—1